(12) United States Patent
Ohkubo et al.

(10) Patent No.: US 8,657,529 B2
(45) Date of Patent: Feb. 25, 2014

(54) METHOD FOR PLANARIZING UNEVENNESS OF THE SEABED

(71) Applicants: Kyowa Co., Ltd., Osaka (JP); Sumitomo Corporation, Osaka (JP)

(72) Inventors: Takahito Ohkubo, Nishinomiya (JP); Toshihiro Tanaka, Tennoji-Ku (JP); Nobuyoshi Oike, Sakai (JP); Hironori Kawamura, Kita-ku (JP); Shinichi Tanaka, Neyagawa (JP); Ikuo Moriyama, Minato-ku (JP); Motoo Yoshioka, Nishinomiya (JP)

(73) Assignees: Kyowa Co., Ltd., Osaka (JP); Sumitomo Corporation, Osaka (JP)

( * ) Notice: Subject to any disclaimer, the term of this patent is extended or adjusted under 35 U.S.C. 154(b) by 0 days.

(21) Appl. No.: 13/753,942

(22) Filed: Jan. 30, 2013

(65) Prior Publication Data

US 2013/0142574 A1    Jun. 6, 2013

Related U.S. Application Data

(63) Continuation of application No. 12/979,602, filed on Dec. 28, 2010, now abandoned.

(30) Foreign Application Priority Data

Dec. 29, 2009   (EP) .................................... 09180856

(51) Int. Cl.
   *F16L 1/16*   (2006.01)
(52) U.S. Cl.
   USPC ........................................ 405/154.1; 405/19
(58) Field of Classification Search
   USPC .............. 405/15, 16, 19, 21, 25, 302.4, 302.7
   See application file for complete search history.

(56) References Cited

U.S. PATENT DOCUMENTS

| | | | |
|---|---|---|---|
| 4,889,446 | A | 12/1989 | Holmberg |
| 6,793,438 | B2 | 9/2004 | Anderson |

FOREIGN PATENT DOCUMENTS

| | | | |
|---|---|---|---|
| EP | 2 036 814 | A2 | 3/2009 |
| JP | 58-113410 | A | 7/1983 |
| JP | 11-225613 | A | 8/1999 |
| JP | 3696389 | B2 | 7/2005 |
| JP | 2006-322400 | A | 11/2006 |

OTHER PUBLICATIONS

European Office Action for related European Patent Application No. 09 180 856.8-2311 dated Feb. 17, 2012, pp. 1-3.
Extended European Search Report, 09180856.8-2311, Aug. 27, 2010, pp. 1-4.
W. H. Shuman, "Lake-bottom Cable Plow-in Proves Out", pp. 48-51, Transmission/Distribution, Electrical World, Feb. 15, 1973.
Non-final Office action for U.S. Appl. No. 12/979,602, mailed Oct. 30, 2012.

*Primary Examiner* — Tara M. Pinnock
(74) *Attorney, Agent, or Firm* — Ditthavong Mori & Steiner, P.C.

(57) ABSTRACT

At a location where unevenness 1000 is present, the condition of a seabed 200 is investigated in advance to examine the respective numbers of large filter units 51 and small filter units 52 to be used, and the position where the large filter units 51 and the small filter units 52 are to be installed. Based on the investigation result, the small filter units 52 are installed on the bottom of the unevenness 1000. The large filter units 51 are installed on the upper surface formed by the installed small filter units 52, and are leveled so that the upper surface formed by the installed large filter units 51 becomes flush with the seabed 200.

9 Claims, 19 Drawing Sheets

METHOD FOR PLANARIZING UNEVENNESS OF THE SEABED

RELATED APPLICATIONS

This application is a continuation of U.S. application Ser. No. 12/979,602 filed Dec. 28, 2010 which claims priority to EP 09180856.8, the entirety of which his incorporated herein by reference.

BACKGROUND OF THE INVENTION

1. Field of the Invention

The present invention relates to methods for planarizing unevenness of the seabed.

2. Description of the Background Art

The seabed has geographical features called "unevenness" which is an uneven surface. Referring to FIG. 16A, unevenness 1000 as used herein refers to a portion that is recessed with respect to the surrounding seabed 200. The seabed 200 is not flat at a location where the unevenness 1000 is present. Thus, it may not be possible to provide a structure at such a location on the seabed 200. A method that deals with the unevenness is disclosed in, e.g., Japanese Patent Publication No. 2006-322400 of unexamined applications. In Japanese Patent Publication No. 2006-322400 of unexamined applications, for installation of a foundation of an offshore wind power generation using a caisson, covering material units are positioned between a friction increasing mat provided on the lower surface of the foundation, and the surface of the seabed in order to deal with the unevenness and to increase frictional resistance. The number of covering material unit is determined corresponding to distribution of the ground level of the seabed.

According to Japanese Patent Publication No. 2006-322400 of unexamined applications, the covering material units are positioned under the foundation in the case of a structure in which the foundation has a planar bottom surface like a caisson. That is, the covering material units are positioned under the structure.

However, the structure of Japanese Patent Publication No. 2006-322400 of unexamined applications cannot be applied to, e.g., linear structures such as submarine cables. If the covering material units are positioned only under the submarine cable, the submarine cable can move onto the unevenness where no covering units are positioned, due to the tidal currents and the like. In such a case, referring to FIG. 16B, a submarine cable 20 is bent over the unevenness 1000, imposing a considerable strain on the submarine cable 20 at both ends 21 and 22 of the unevenness 1000. Thus, the submarine cable 20 can be damaged. One conventional possible solution to this problem is to repair the unevenness by dumping crushed stones with a tremie pipe or the like. However, the dumped crushed stones can be carried away by the influence of the tidal currents, whereby the unevenness can be restored. Another conventional possible solution is to repair the unevenness by installing a wire cylinder, a large concrete block, or the like therein. However, the wire cylinder, the large concrete block, or the like do not completely fit in the unevenness, and the part of the wire cylinder, the large concrete block, or the like, which does not fit in the unevenness, serves as resistance to the tidal currents, causing an excess flow. Such an excess flow causes a phenomenon called "scouring," a phenomenon that the seabed is worn away and chipped off, near the part of the wire cylinder, the large concrete block, or the like serving as resistance. Thus, the unevenness can be restored.

SUMMARY OF THE INVENTION

It is an object of the present invention to provide a method for planarizing unevenness of the seabed.

According to the present invention, a method for planarizing unevenness which is an uneven surface of a seabed includes the steps of: installing a plurality of bag-shaped filter units, each containing predetermined block objects, on the unevenness; and leveling the plurality of installed filter units so that an upper surface formed by the plurality of installed filter units becomes flush with the seabed.

Preferably, the step of installing the plurality of filter units includes the step of locating a position where the filter units are to be installed, by using a GPS.

According to the present invention, the plurality of bag-shaped filter units, each containing predetermined block objects, are installed on the unevenness, and the plurality of installed filter units are leveled so that the upper surface formed by the plurality of installed filter units becomes flush with the seabed. Thus, the unevenness can be turned into a substantially flat seabed.

Preferably, the filter units include a first filter unit having a first size and a second filter unit having a second size larger than the first size, and, the step of installing the plurality of filter units includes the step of placing the second filter unit on the first filter unit.

Preferably, the filter units have a predetermined size and the step of installing the plurality of filter units includes the step of placing crushed stones on said unevenness before placing the filter units with the predetermined size.

Preferably, the filter units have a predetermined outer size and include a first filter unit having a first block objects with a first size and a second filter unit having a second block objects with a second size larger than the first size, and the step of installing said plurality of filter units includes the step of placing the second filter unit on the first filter unit.

Preferably, the step of installing the plurality of filter units includes the step of placing crushed stones at the bottom of said unevenness before placing a plurality of the filter units.

Preferably, the volume of the filter units is equal or smaller than the volume of the unevenness.

Preferably, the filter unit includes a bag body and block objects, and when the filter unit is hung up, assuming that the height of the bag body from the closed portion to the bottom is H1 and the height of a space without the block objects is H2, the amount of block objects obtained by (H2/H1)×100 is 25-80%.

Still preferably, the porosity of the knitted fabric of the bag body is 45% to 90%.

DESCRIPTION OF THE PREFERRED EMBODIMENTS

(1) First Embodiment

Figure 1:
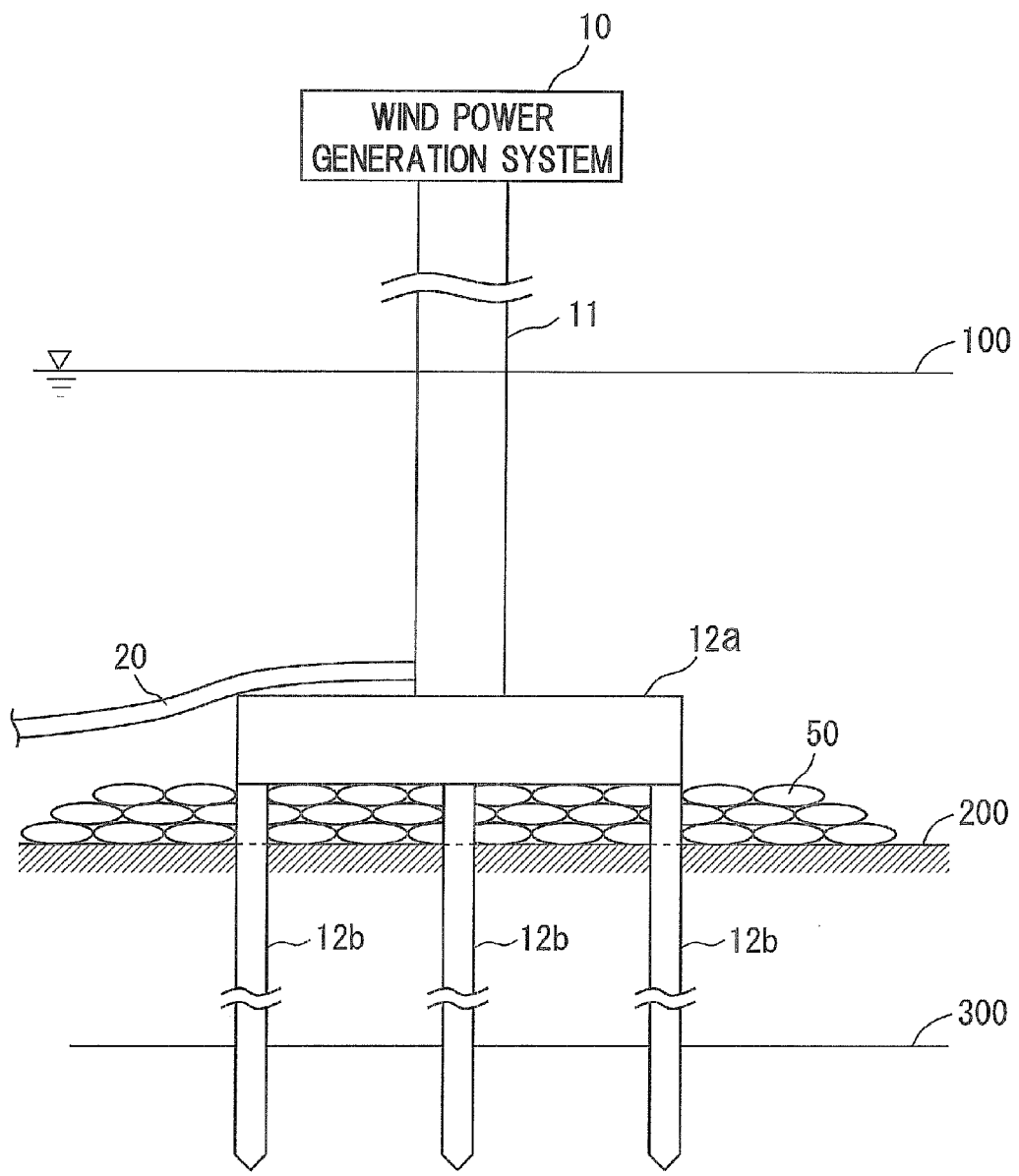
FIG. 1 is a schematic view showing a wind power generation system, a tower, and a foundation, to which a method for constructing a foundation for a wind power generation system of the first embodiment is applied.

An embodiment of the present invention will be described below with reference to the accompanying drawings. FIG. 1 is a schematic view showing a wind power generation system and a tower which are settled on a foundation to which a method for constructing the foundation for a wind power generation system according to an embodiment of the present invention is applied. Note that the present embodiment is described with respect to an example in which the wind power generation system and the tower are supported by the foundation having piles as a base. FIG. 1 shows an offshore wind power generation system 10 for generating electrical power from offshore wind energy, a tower 11, a base slab portion 12a, piles 12b, a plurality of filter units (hereinafter referred to as the "FUs") 50, and a cable 20. The tower 11 holds the offshore wind power generation system 10, and extends down to a level near a seabed 200 through a sea surface 100. The base slab portion 12a, which is made of concrete, is fixed to the tower 11 by anchor bolts, and supports the tower 11. Each pile 12b, which is made of a steel pipe, is provided so as to be supported by a predetermined ground, and fixes the base slab portion 12a on its upper end by anchor bolts to support the base slab portion 12a. The FUs 50 are installed between the seabed 200 and the piles 12b. The cable 20 is extended outward from the tower 11 near the seabed 200 to transmit the electricity, generated by the wind power generation system 10, to a land-based system (not shown). Note that the tower 11 extends to such a height that enables the wind power generation system 10 to efficiently receive offshore winds. The predetermined ground 300 in which the piles 12b are fixed indicates a layer of the ground called a "bearing layer" in FIG. 1. The bearing layer is strong enough to endure the load of the wind power generation system and the tower under various conditions such as meteorological and hydrographic conditions. That is, the piles 12b are driven into the ground until they reach the bearing layer, and the piles 12b are fixed in the bearing layer. Note that the foundation in the present embodiment includes the base slab portion 12a and the piles 12b.

Figure 2A:
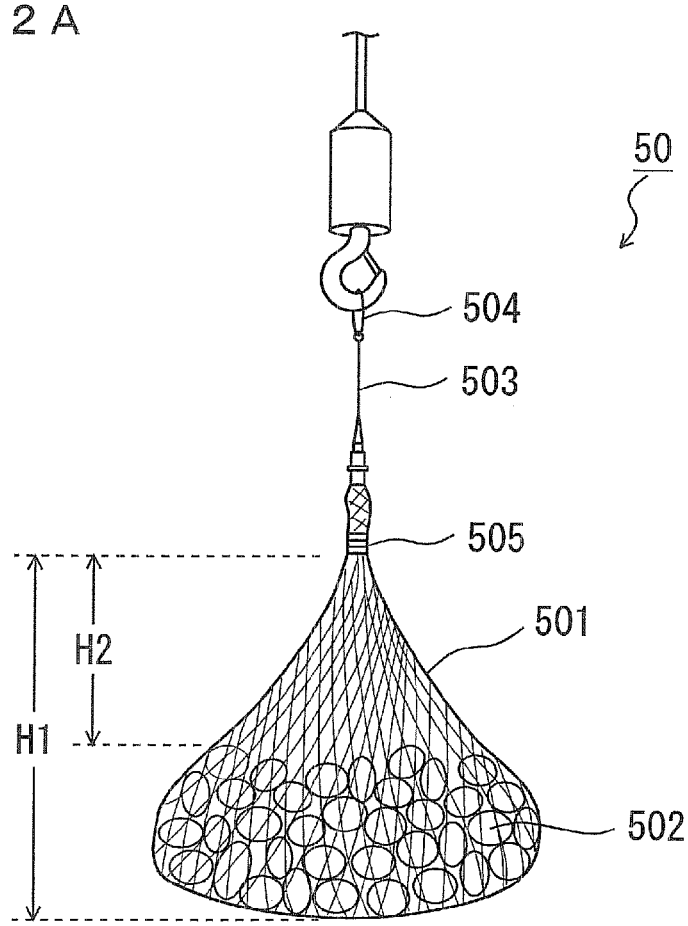
FIG. 2A is a schematic view showing a filter unit (FU)

The structure of the FU 50 used in the present embodiment will be described below. FIG. 2A is a schematic view showing the state where the FU 50 is suspended by a crane of a work ship or the like, and FIG. 2B is a schematic view showing the state where the FU 50 is installed on an uneven seabed.

Figure 2B:
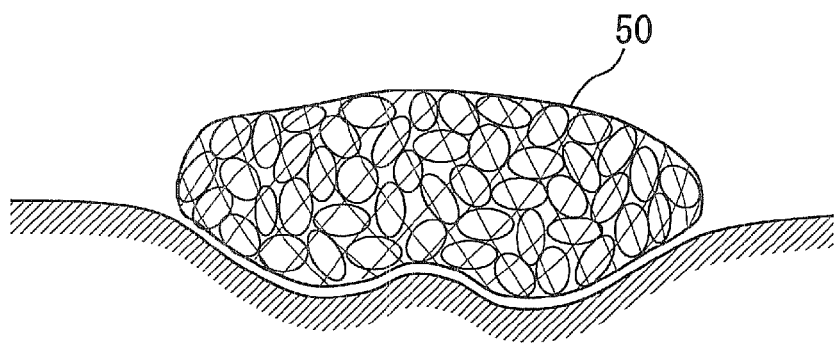
FIG. 2B is a schematic view showing the state where the FU is installed on an uneven surface of the seabed.

Referring to FIGS. 2A and 2B, a bag comprising a bag body 501 knitted with synthetic fiber yarn in which a predetermined amount of block objects such as crushed stones are placed is called the FU. The FU 50 containing the block objects 502 includes a suspension rope 503 that allows the bag body 501 to be suspended by a crane or the like, and a connection portion 504 provided at an end of the suspension rope 503, and connectable to the crane for suspending the bag body 501. The FU 50 used herein has a diameter of approximately 2.5 m when installed on a flat ground and its weight is roughly 4 t. The synthetic fiber used for the bag body 501 is, e.g., polyester. Thus, the bag body 501 does not rust in the sea water, has high resistance to acidic and alkaline water, and is less likely to corrode. Note that the synthetic fiber is not limited to polyester, and may be nylon, polypropylene, polyethylene, or the like. In addition, since a yarn of a FU is synthetic resin, endocrine disrupter and heavy metal will not solve out and no adverse effect is brought about.

In the bag body 501, the longer side N of the mesh of the net is 50 mm, and the yarn diameter M is 10 mm. It is preferable that the yarn diameter M and the longer side N of the mesh have a relation of $3 \leq N/M \leq 20$ (unit to be mm). Under this relation, none of the block objects 502 described below drop out of the mesh and the bag body 501 keeps its strength longer.

It is preferable that the predetermined amount of the block objects 502 be determined so that the porosity of the knitted fabric becomes 45% to 90%. This ensures formation of porous voids in the FU 50, thereby reducing the dragging force while the water currents at the seabed 200 are flowing through the bag body 501. Thus, no flowing water pressure is applied to the FU 50, preventing a phenomenon called "scouring," a phenomenon that the seabed 200 is worn away. Although the porosity relates also to the size of the block objects 502 placed in the bag body 501, at the porosity of less than 45%, the flowing water pressure is applied to the FU 50, causing scouring around the bag body 501. On the other hand, at the porosity of more than 90%, the retention of the block objects 502 is reduced.

It is preferable that the bag body 501 be formed by knitted fabric (e.g., a raschel net) having an elongation of 30% to 80%. This enables the flexibility to be ensured, and also enables the bag body 501 to follow any shape at an installation position of the FU 50, and to be maintained in a stable state for a long time after installation of the FU 50. That is, the FU 50 can be stably maintained at the installation position for a long time, regardless of whether the installation location is flat or not.

The block objects 502 contained in the FU 50 preferably has its diameter to be 50-300 mm and specific gravity large enough to prevent the FU 50 from being dragged when the FU 50 is installed on the seabed 200. For example, the block objects 502 are crushed stones having a grain size of 100 mm and specific gravity of 2.65. Thus, the FU 50 has a weight heavy enough to be unsusceptible to buoyancy and water currents under the sea. Note that, the smaller the grain size of the block objects 502 is, the more the bag body 501 adapts to the shape of the installation location. It is preferable that the grain size of the block objects 502 be approximately about two times the longer side N of the mesh.

Next, the predetermined amount of block objects 502 to be placed in the bag is to be explained. With reference to FIG. 2A showing a bag when it is hung up, assuming that the height of the bag 501 from the closed portion 505 to the bottom is H1 and the height of a space without block objects 502 is H2. The predetermined amount of block objects 502 in the bag 501 is an amount that the value obtained by (H2/H1)×100 is preferably 25-80%. The reason is that when the value is less than 25%, it means that the block objects reach its closed portion 505 and the adaptability to the installation position is reduced and it becomes difficult to place the bag close to the desired position. When the value is more than 80%, the shape of the FU can be changed easily, less stable, and light weight against its volume, it is possible that the FU can be driven away by a tidal wave.

In addition, since the FU has a structure described above, when it is located in the seabed, the meritorious effect is brought about that preferable environment can be provided for plants and fish in the sea.

Next, the explanation is made as to the size of the FU. In the following explanation, the FU whose weight is less than 4 t, the diameter when it is set is less than 2 m, and the volume is less than 2 m3 is referred to as "a small FU", whereas the FU whose weight is 4-20 ton, the diameter when it is set is 2 m-5 m, and the volume is 2-13 m3 is referred to as "a large FU". The material and the diameter of the yarn, the mesh size including the longer side of the mesh, the diameter and specific weight of the block objects are same for both the small and the large FUs.

The Table 1 below shows an example of the relation between the weight (size) of the individual FU and an effective flow rate of the tidal currents. Note that it is assumed in Table 1 that the same block objects whose diameter is 50-300 mm and specific weight is 2.65 are placed in each FU.

TABLE 1

| Weight of FU (t) | Effective Flow Rate of Tidal Currents (m/s) |
|---|---|
| 2 | Roughly 4.7 or less |
| 4 | Roughly 5.3 or less |
| 8 | Roughly 5.9 or less |
| 20 | Roughly 7.0 or less |

As shown in Table 1, an appropriate type of FUs may be used according to the flow rate of tidal currents. For example, FUs having a weight of 4 t are used when the flow rate of the tidal currents is 5.0 m/s at the position where the FUs are to be installed. In addition, it is possible to change the weight of the FU and the size of block objects depending on the conditions of the performance at the position where FUs are set. As shown in Table 1, the larger the FU, the more effective to the flow rate of the tidal current, compared with the smaller FU.

In the following description, the FU 50 described above is used unless otherwise specified.

Note that, although the factors, such as the size of the FU 50 itself, the material of the yarn, the thickness of the yarn, the grain size and the specific weight of the block objects are specified in the above FU 50, the present invention is not limited to the FU 50 specified by these factors. The FU 50 may be specified by various other factors.

Note that, for example, it is preferable that the FU used here is a scouring preventing material for an underwater structure disclosed in Japanese Patent No. 3,696,389.

Figure 3A:
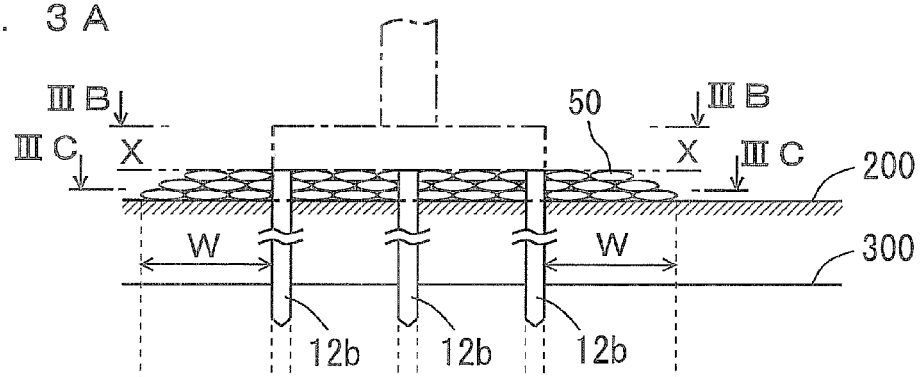
FIG. 3A is a side view of piles showing how FUs are located among piles.
Figure 3B:
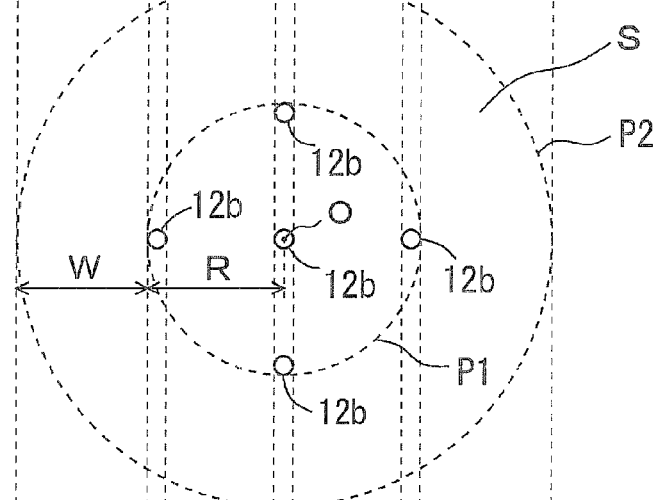
FIG. 3B is a diagram viewed from III B-III-B in FIG. 3A.
Figure 3C:
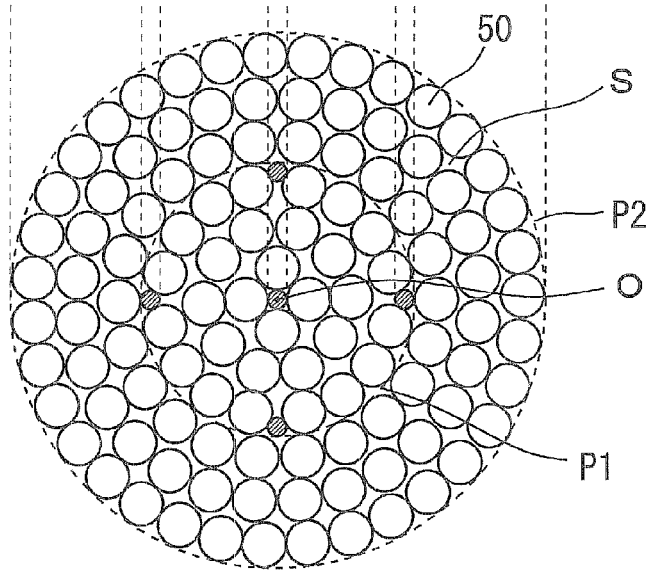
FIG. 3C is a diagram viewed from III C-III C in FIG. 3A.

A method for installing the FUs according to the present embodiment will be described below. FIG. 3A is a schematic-diagram seen from side showing an example around the piles 12b when FUs are set around the pile 12b right before the base slab portion 12a is installed. FIG. 3B is a diagram viewed from III B-III B in FIG. 3A, and FIG. 3C is a diagram viewed from III C-III C in FIG. 3A. First, referring to FIG. 3A, the FUs 50 are installed between the seabed 200 and the piles 12b supporting the base slab portion at their upper ends. As shown by chain double-dashed line X in FIG. 3A, it is preferable that the FUs 50 be installed with no gap formed therebetween, until a flat surface is formed by the plurality of FUs 50 according to the height of the heads of the piles 12b. This allows the bottom surface of the base slab portion to closely contact the piles 12b and the FUs when the base slab portion is installed, whereby the piles 12b, the base slab portion, and the FUs 50 are integrated together. This can increase the strength as a foundation including the base slab portion and the base, and can reduce the influence of tidal currents, including scouring. That is, this can increase the bearing force as a foundation for supporting the wind power generation system and the tower. Referring to FIG. 3B, a point O is the position where the center of the base slab portion is located when the base slab portion is installed on the piles 12b. The distance from the point O to the outermost position of the circumference of each pile 12b located farthest from the point O is R meters (hereinafter "m"). A circle P1 is a circle having its center located at the point O and having a radius of R m. In this case, it is preferable that the lowermost layer of the FUs 50 be provided in a range surrounded by a circle P2 having its center located at the point O and having a radius of about (R+W) m (see FIG. 3C). When W is between 4 m and 15 m, the effect that scouring is prevented and it is preferable that W=6 m. The larger the installation range of the FUs 50 is, the more the effects of the FUs 50 as described above are expected to be obtained. However, the effects of the FUs 50 substantially level off when the installation range of the FUs 50 exceeds the circle P2. Thus, from the standpoint of construction such as the number of FUs 50 to be installed and the amount of construction work, and the standpoint of the effects such as the effectiveness of the FUs 50, the installation range of the lowermost layer of the FUs 50 is preferably in the range surrounded by the circle P2 having a radius of about (R+6) m about the point O. Referring to FIG. 3C, it is preferable that, in a range S (a portion of the circle P2 other than the circle P1), the FUs 50 in the lowermost layer be arranged in two to five layers in the radial direction concentrically about the point O (FIGS. 3A and 3C show an example in which the FUs 50 are arranged in three layers in the radial direction). Arranging small FUs in a plurality of lines in the radial direction in the range S can implement higher stability than arranging large FUs in a single layer in the radial direction in the range S. Further, a group effect is provided by the plurality of FUs 50 when the FUs 50 form a group. The group effect is the effect that a FU that is directly influenced by the water currents is supported by other FUs around the FU and a plurality of FUs forming the group can stably remain at the set location. As a result, a meritorious effect of preventing scour and so on can last for a long time. Contrary, arranging the FUs 50 in a single layer in the radial direction provides no effect of suppressing a turbulent flow that is caused when the tidal currents strike the foundation, and the foundation can be influenced by an excess flow generated by the tower. On the other hand, the above group effect levels off when the FUs 50 are arranged in six or more layers in the radial direction.

The larger the overall thickness of the FUs 50, that is, the number of layers of the FUs 50 in the vertical direction, is, the higher effects the FUs 50 are expected to have. This is because increasing the overall thickness of the FUs 50 improves engagement between the plurality of FUs 50. Thus, the plurality of FUs 50 closely contact each other, are fixed together with no gap formed therebetween and decrease possibility of earth and sand being sucked out from the seabed surface. This increases the stability of the plurality of installed FUs 50, enabling the influence of the tidal currents including scouring to be reduced for a long time. On the other hand, the effect of preventing scouring substantially levels off when the overall thickness is equal to three or more layers. Thus, as described above, from the standpoint of construction such as the number of FUs 50 to be installed and the amount of construction work, and the standpoint of the effects such as the effectiveness of the FUs 50, it is preferable that the overall thickness of the FUs 50 be equal to two to three layers.

In addition, usually, one sized FUs are used to implement this embodiment, FUs whose sizes are different can be used. In this case, when FUs of different sizes are installed in two or more layers, it is preferable that the smaller FUs are set at the lower position and the larger FUs are at higher position. The reason for this installation is that the smaller FUs follow unevenness of the seabed, engagement between the installed FUs and the seabed. As a result, FUs 50 maintain in a stable state for a long time after installation. Further, since the top surface of set smaller FUs is smoother than that of the seabed, the large FUs are stably located on the small FUs. Thus, flow rate of the tidal current can be effectively reduced.

Further, installing the FUs 50 around the seabed 200 having the piles 12*b* driven therein increases the lateral pressure applied to the underground part of each pile 12*b* from the surrounding ground. Thus, a gap is less likely to be formed between each pile 12*b*, and the ground and the bearing layer which surround the underground part of the pile 12*b*. This can suppress a moment that is generated near the seabed 200 in each pile 12*b*. Further, since a plurality of FUs installed serves as a part of the foundation, the size of the foundation can be compact.

As described above, since the plurality of FUs 50 are installed between the seabed 200 and each pile 12*b*, a gap is less likely to be formed between each pile 12*b*, and the ground and the bearing layer which surround the underground part of the pile 12*b*. This can suppress a moment that is generated near the seabed 200 in the pile 12*b*, and can prevent scouring that occurs around each pile 12*b*. As a result, the bearing force and the durability of the foundation having the piles 12*b* as a base can be improved.

Figure 4A:
FIGS. 4A, 4B, 4C, 4D, 4E, and 4F are diagrams sequentially illustrating the method for constructing a foundation for a wind power generation system.
Figure 4B:
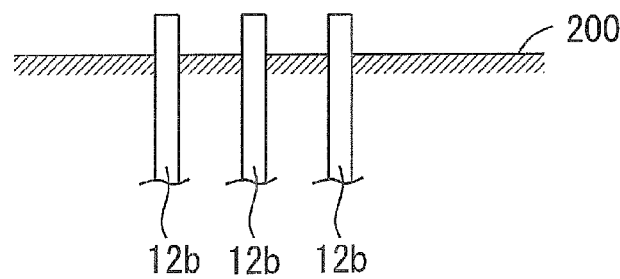
Figure 4C:
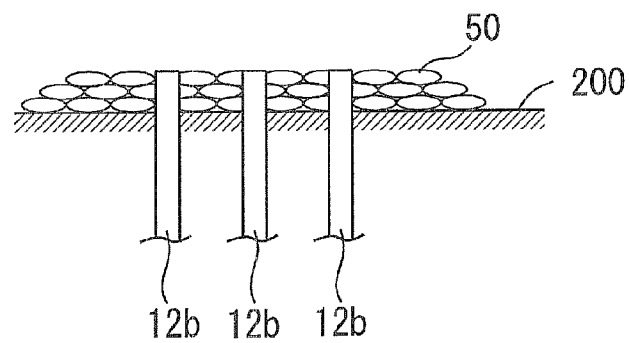
Figure 4D:
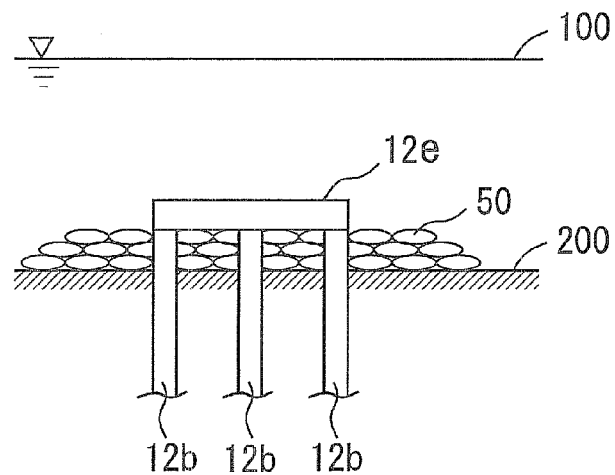
Figure 4E:
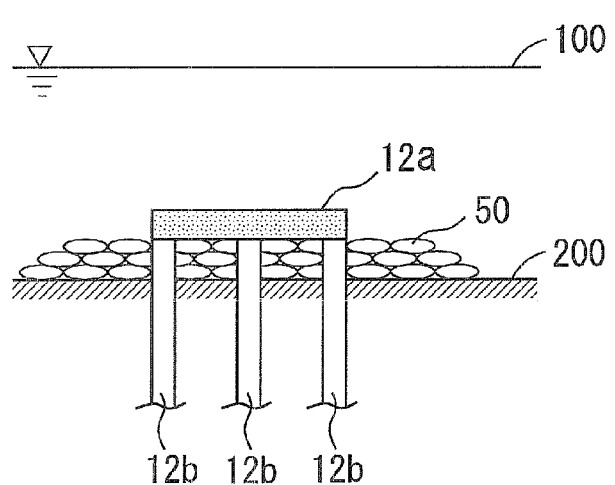
Figure 4F:
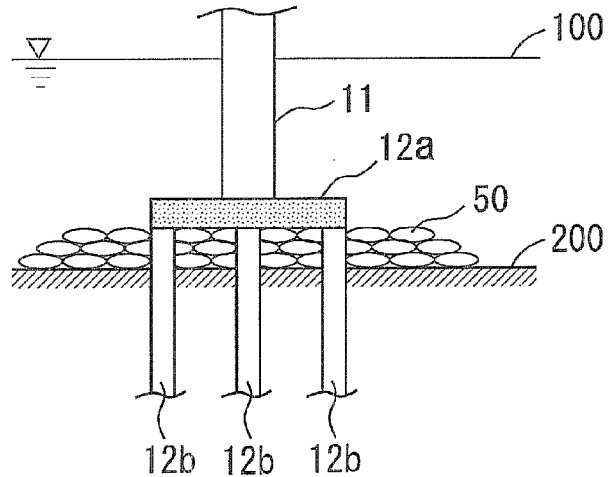

A method for constructing a foundation for a wind power generation system according to the present embodiment will be described below. FIGS. 4A through 4F are diagrams sequentially illustrating construction of the foundation for the wind power generation system. First, at a location where the wind power generation system is to be installed, the condition of the seabed 200 and the condition of the tidal currents near the seabed 200 are investigated in advance to examine the size of the FUs, the number of FUs 50 and the position where the FUs 50 are to be installed (FIG. 4A). Next, based on the investigation result, the piles 12*b* as a base of the foundation are provided so as to be supported by the bearing layer (FIG. 4B). Then, as described above, a plurality of FUs 50 are installed in close contact with each other between the seabed 200 and each pile 12*b* (FIG. 4C). At this time, a flat surface is formed by the plurality of FUs 50 according to the height of the heads of the piles 12*b*. Then, a formwork 12*e* for the base slab portion 12*a* is installed on the upper ends of the piles 12*b* (FIG. 4D). At this time, the bottom surface of the formwork 12*e* and the upper ends of the piles 12*b* are fixed to each other. Then, concrete is placed in the formwork 12*e* to form the base slab portion 12*a* (FIG. 4E). Then, the tower 11 is fixed to the upper end of the base slab portion 12*a* (FIG. 4F).

According to the above method, the piles 12*b* are provided so as to be supported by the bearing layer, the plurality of FUs 50 are installed between the seabed 200 and each pile 12*b*, and the base slab portion 12*a* is provided on the upper ends of the piles 12*b*. This prevents scouring from occurring for a long time, since influence of the tidal current is decreased around the foundation on the sea bed and protect the seabed 200 near the piles 12*b*. In addition, this increases the lateral pressure that is applied to the underground part of each pile 12*b* from the surrounding ground. Thus, a gap is less likely to be formed between each pile 12*b*. As a result, both the bearing force and the durability of the foundation are increased. Further, since a plurality of FUs installed serves as a part of the foundation, the size of the foundation can be compact In addition, since the net yarn of the FUs is made of synthetic fiber and FUs are porous, endocrine disrupter and heavy metal will not solve out and it is possible to provide biotope for seaweeds and fish. Further, the foundation can be made compact, since the FUs work as a par of foundation.

Figure 5:
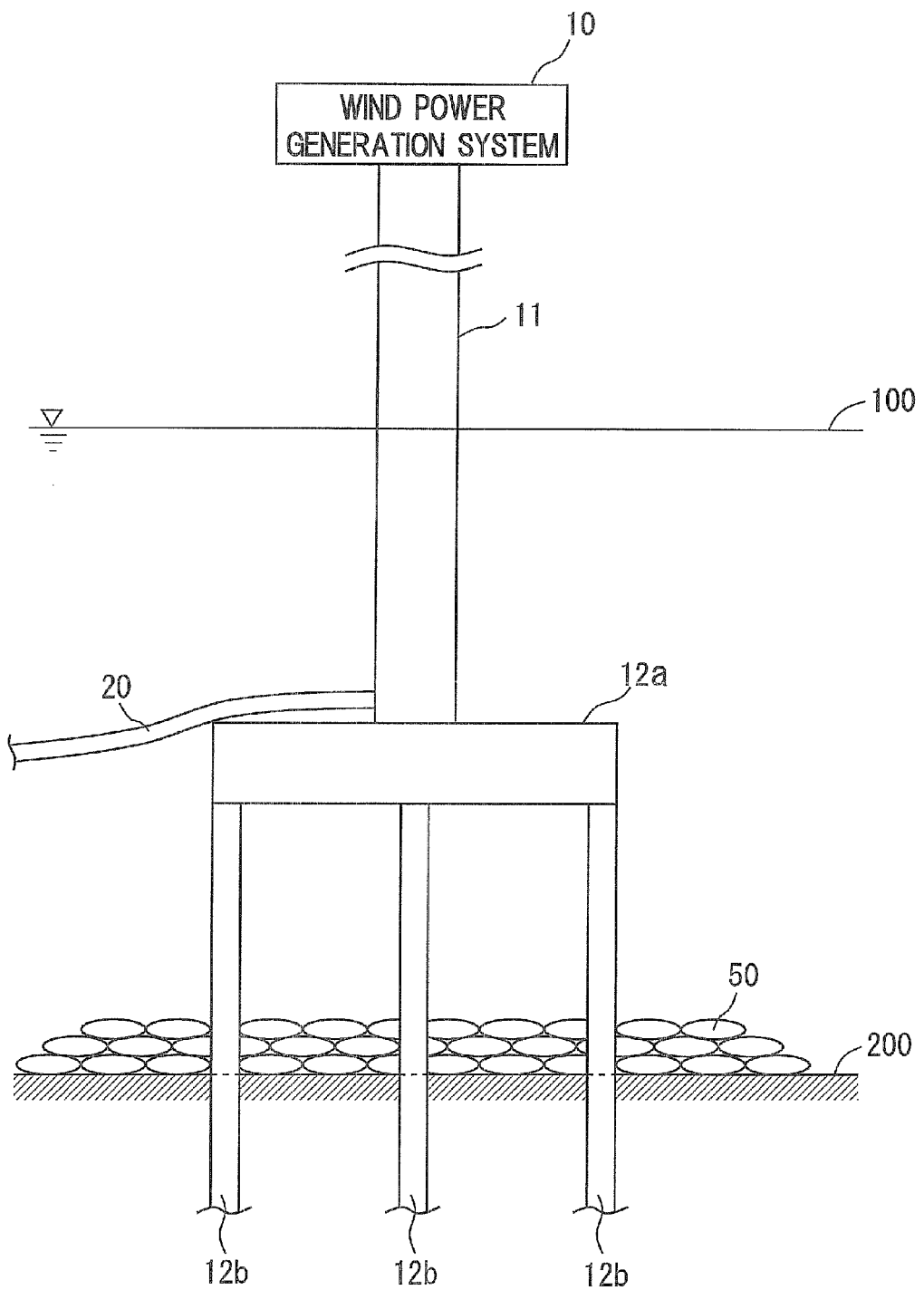
FIG. 5 is a schematic view showing a tower, and a foundation, to which another method for constructing a foundation for a wind power generation system of the first embodiment is applied.

Next, the alternate embodiment is described. In this embodiment, as shown FIG. 5, a space is provided between the upper portion of the FUs and the base slab portion 12*a*. Since the other portion is the same as above described embodiment, the explanation thereof will not be reiterated.

In this alternate embodiment, similar to the above described embodiment, it is possible to prevent scouring from occurring for a long time, since influence of the tidal current is decreased around the foundation on the sea bed 200 and to protect the seabed 200 near the piles 12*b*. In addition, since the lateral pressure is increased that is applied to the underground part of each pile 12*b* from the surrounding ground, a gap is less likely to be formed between each pile 12*b*.

Figure 6A:
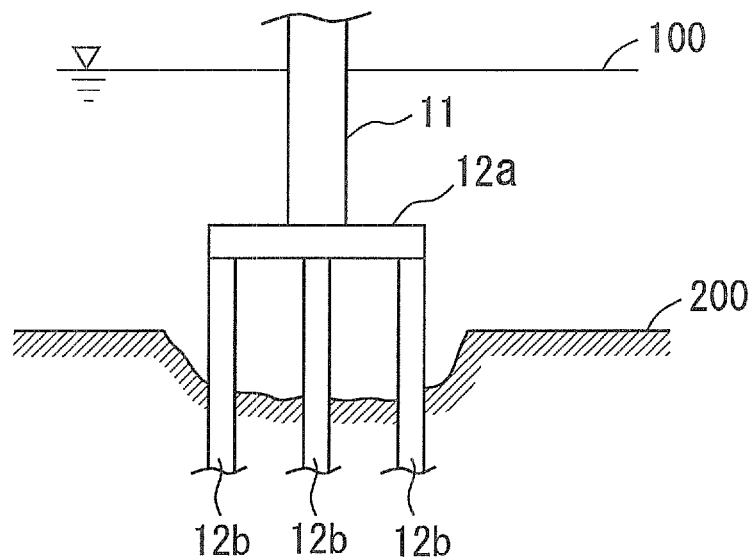
FIGS. 6A and 6B are schematic view showing an example in which FUs are installed for an existing foundation.
Figure 6B:
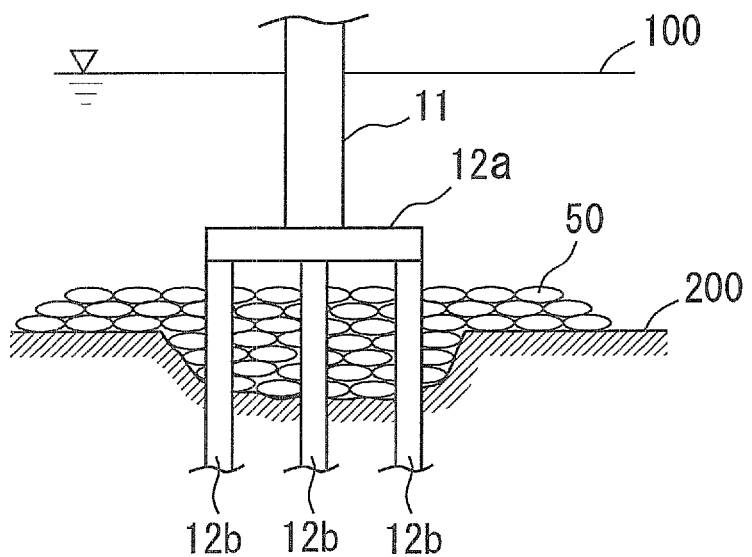

Next, further alternate embodiment is described. In this embodiment the FUs are installed in a foundation of an existing wind power generation system. FIGS. 6A and 6B are diagrams showing this embodiment. FIG. 6A shows an existing wind power generation system to which this embodiment is applied. As shown in FIG. 6A, space is formed between the foundation 12*a*, 12*b* and the surrounding seabed 200. FIG. 6B shows a state where a plurality of FUs 50 are installed between the piles, serving as the base of the foundation and the seabed 200. In this embodiment, similar to the above embodiment, scouring can be prevented from occurring for a long time, since influence of the tidal current is decreased around the foundation on the sea bed and protect the seabed 200 near the piles 12*b*. In addition, this increases the lateral pressure that is applied to the underground part of each pile 12*b* from the surrounding ground. Thus, a gap is less likely to be formed between each pile 12*b*. In this embodiment, the FUs are installed around the deformed concave portion of the seabed which might be formed by scouring, for example. The present invention may be applied to the seabed which is not deformed.

In this alternate embodiment, the same meritorious effect is brought about as described above.

In the first embodiment, an example is described in which one type of FUs are installed. However, the present invention is not limited to this, and two kinds of FUs, one is a large FU and the other is a small FU, may be used. In this case, large FUs and small FUs are installed overlapped. In addition, when FUs are installed in three layers, at first small FUs are installed in one layer at the bottom, and then, two layers of large FUs are installed on the small FUs as described above. Thus, in addition to the effect described in FIG. 3, effects are obtained that FUs remain stably longer period and rate of tidal current can be effectively reduced.

A plurality of FUs may be installed in which different kinds of block objects are placed. For example, at first a first FUs including block objects having small size, and then a second FUs including block objects having large size. Thus, the first FUs prevents earth and sand from being sucked out from the seabed surface, follow the unevenness of the seabed. Further, engagement between the plurality of FUs 50 are improved and FUs remain stably for a long time due to the fact that the plurality of FUs 50 closely contact each other and are fixed together with no gap formed therebetween. In addition, since the second FUs having large sized block objects faces the tidal current, FUs are located stably and decrease current speed of the tidal current effectively.

In addition, since "the size of FUs" has nothing to do with "the grain size of the block object filled in the FUs", a synergetic effect is brought about by the large FUs including block objects having large size compared with the effect brought about by large FUs including small sized block objects, and small FUs including large sized block objects. For example, the large FUs including large sized block objects more stably maintain themselves than the small FUs including large sized block objects and the large FUs including small sized block objects.

Note that the above embodiment is described with respect to an example in which the base slab portion 12a is formed by providing the formwork 12e for the base slab portion 12a on the upper ends of the piles 12b, and placing concrete into the formwork 12e. However, the present invention is not limited to this, and a concrete base slab portion 12a, which has been fabricated in advance, may be provided on the upper ends of the piles 12b.

In addition, although the steel pile is used in this embodiment, the concrete pile may be used.

(2) Second Embodiment

Figure 7:
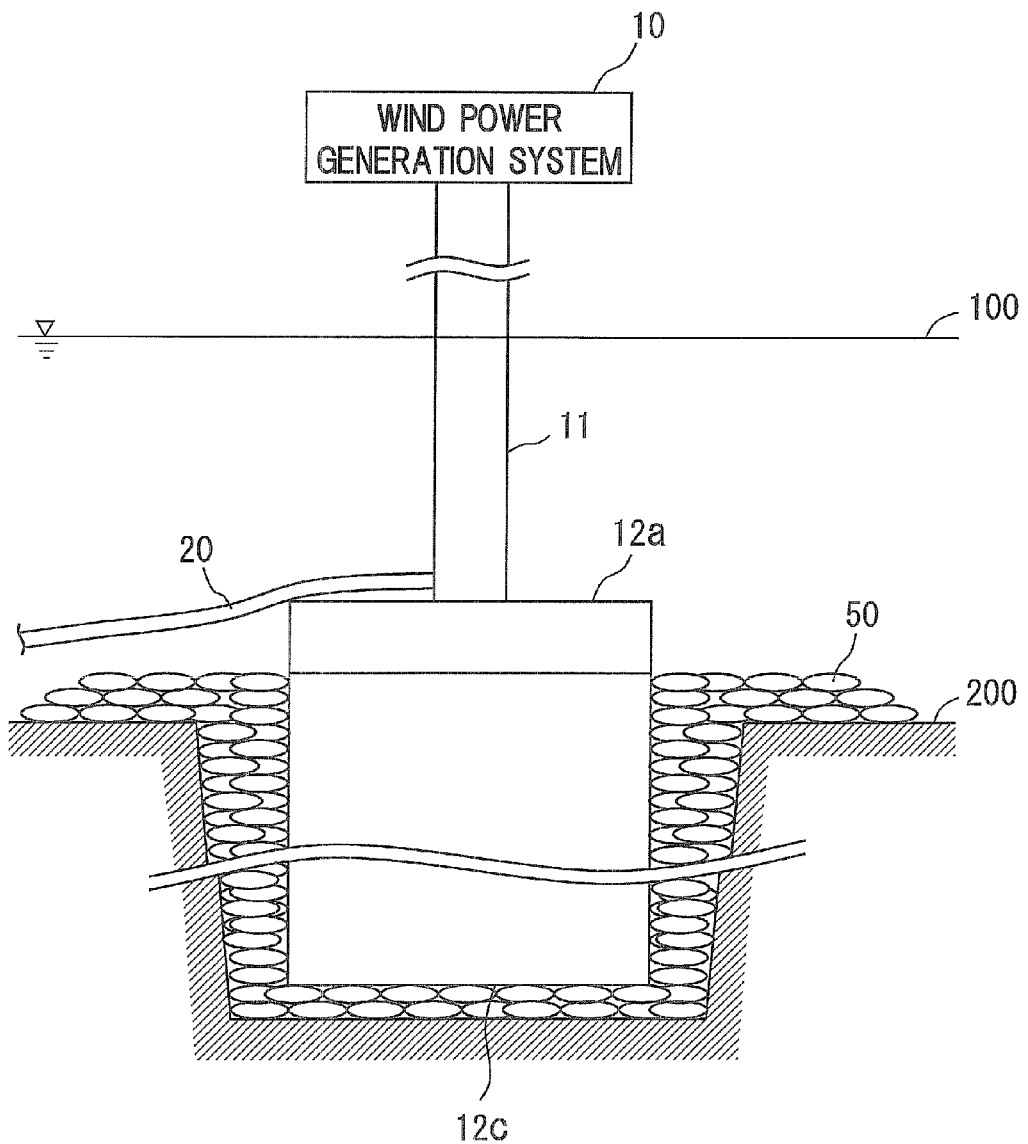
FIG. 7 is a schematic view showing a tower, and a foundation, to which a method for constructing a foundation for a wind power generation system of the second embodiment is applied.

The second embodiment will be described below. In the second embodiment, a wind power generation system is supported by a foundation having a caisson as a base. FIG. 7 is a cross-sectional view showing a wind power generation system, a tower, and a foundation to which a method for constructing a foundation for a wind power generation system according to the present embodiment is applied. FIG. 7 shows an offshore wind power generation system 10, a tower 11, a base slab portion 12a, a caisson 12c, a plurality of FUs 50, and a power transmission cable 20. The tower 11 retains the offshore wind power generation system 10, and extends down to a level near the seabed 200 through the sea surface 100. The base slab portion 12a, which is made of concrete, is fixed to the tower 11 by anchor bolts, and supports the tower 11. The caisson 12c, which is made of concrete, is fixed in the excavated seabed 200, and supports the base slab portion 12a on its upper end. The plurality of FUs 50 are installed between the seabed 200 and the caisson 12c. The power transmission cable 20 is extended outward from the tower 11 near the seabed 200 to transmit the electricity, generated by the wind power generation system 10, to a land-based ground system (not shown). Note that the foundation in the present embodiment includes the base slab portion 12a and the caisson 12c, and the caisson 12c is formed by placing concrete into a formwork. The FUs 50 used in the present embodiment are similar to those of the above embodiment.

Figure 8A:
FIGS. 8A, 8B, 8C, 8D, 8E, 8F, 8G, and 8H are diagrams sequentially illustrating the method for constructing a foundation for a wind power generation system of the second embodiment.
Figure 8B:
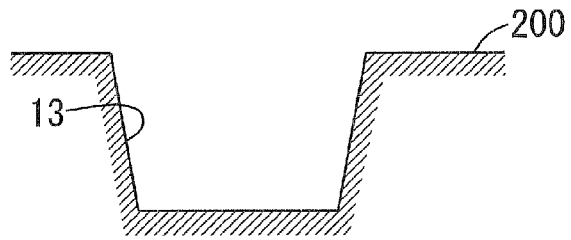
Figure 8C:
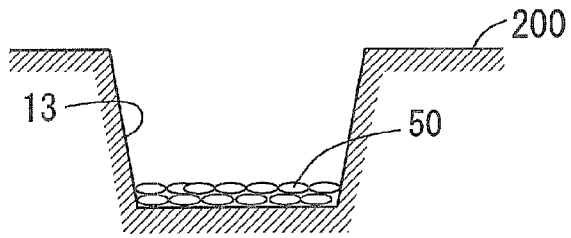

A method for constructing a foundation for a wind power generation system according to the second embodiment will be described below. FIGS. 8A through 8H are diagrams sequentially illustrating construction of the foundation for the wind power generation system. FIG. 8I is a diagram viewed from position VIII I-VIII I in FIG. 8E. First, at a location where the wind power generation system is to be installed, the condition of the seabed 200 and the condition of the tidal currents near the seabed 200 are investigated in advance to examine the size and the number of FUs 50 and the position where the FUs 50 are to be installed (FIG. 8A). Next, based on the investigation result, the seabed 200 is excavated to the depth at which the caisson 12c, which is a base of the foundation, is fixed by the seabed 200, thereby forming a hole 13 for installing the formwork 12d for the caisson 12c therein (FIG. 6B). At this time, an open cut method (open cut mining) may be used. The size of the drilled hole 13 is large enough to support the wind power generation system 10, the tower 11, the base slab 12a and the caisson 12c to be provided therein. Then, a plurality of FUs 50 are installed flat on the bottom surface of the drilled hole 13 (FIG. 8C). At this time, it is preferable that the small FUs are installed. By this, the small FUs 50 follow unevenness of the seabed and gaps to be formed between a plurality of FUs can be made small. As a result, when the caisson 12c, the base slab portion 12a, and the like are installed above the FUs 50, a plurality of FUs, the caisson 12c, the base slab portion 12a can maintain their locations stable. In addition, when a gap formed between FUs is large, the gap can be reduced by using large FUs or by using both large FUs and small FUs. In addition, there is no limitation as to the number of layers of FUs to be stacked. The more the number of layers, the more effect is obtained that earth and sand are prevented from being sucked out from the seabed surface and that the caisson 12c and the base slab portion 12a can maintain their stable state.

Figure 8D:
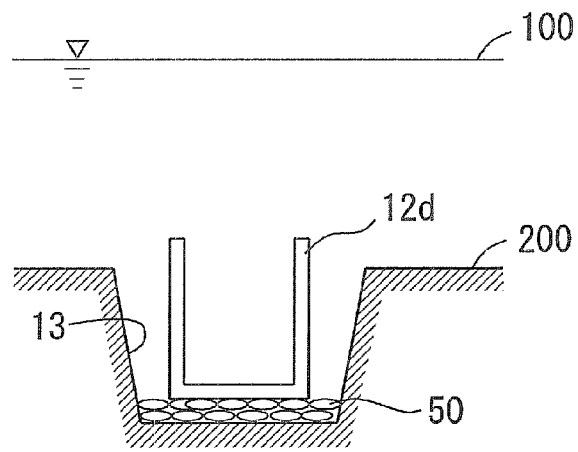
Figure 8E:
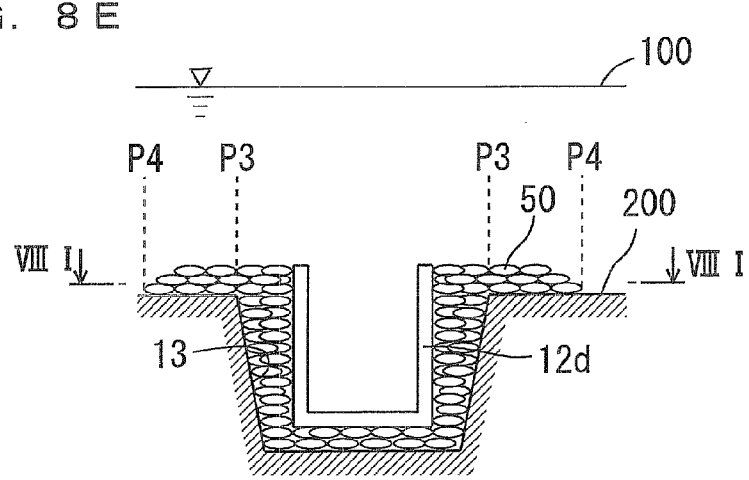
Figure 8F:
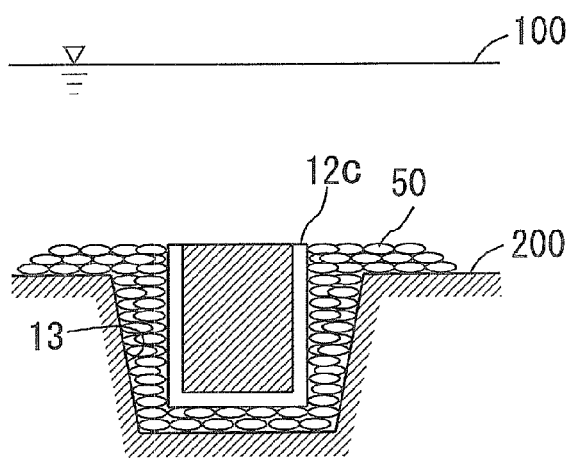
Figure 8G:
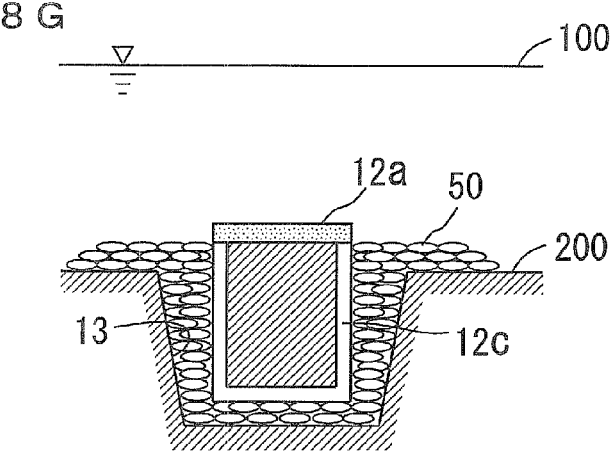
Figure 8H:
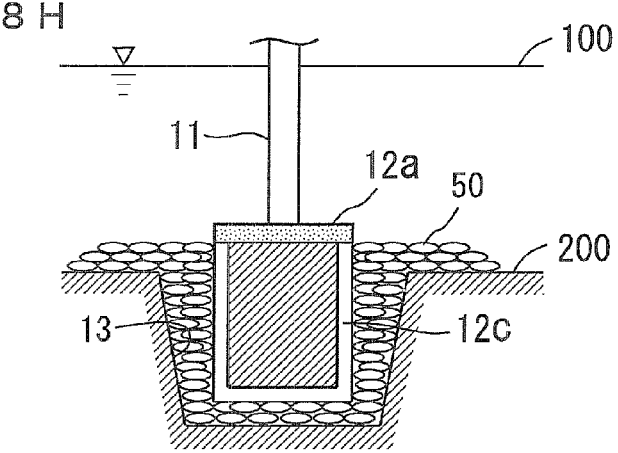
Figure 8I:
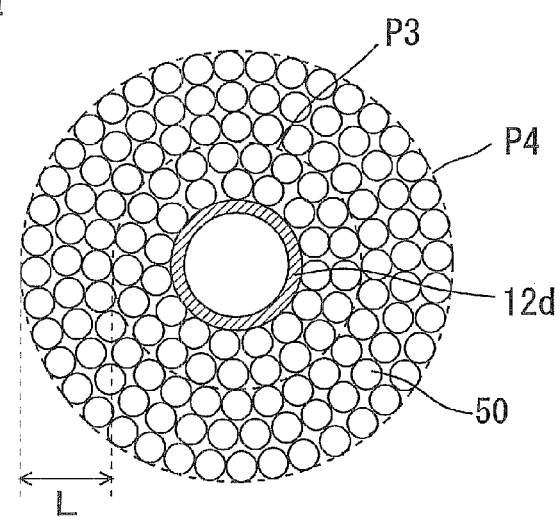
FIG. 8I is a diagram viewed from position VIII I-VIII I in FIG. 8E.

Then, the formwork 12d for forming the caisson 12c is installed on the FUs 50 installed on the bottom surface of the hole 13 (FIG. 8D). Note that the formwork 12d can be regarded as a part of the caisson 12c described below. Then, a plurality of FUs 50 are installed in close contact with each other so as to fill the gap between the seabed 200 and the formwork 12d for the caisson 12c as a base, that is, between the formwork 12d for the caisson 12c and the drilled hole 13 (FIG. 8E). At this time, it is preferable that the FUs 50 in the lowermost layer be arranged in two to five columns in the radial direction in a range of width L from the outer circumferential edge of the drilled hole 13 (a portion of a circle P4 other than a circle P3 in FIG. 8I). It is preferable that L is approximately 6 m. It is also preferable to install the plurality of FUs 50 so that the FUs 50 having an overall thickness of three layers closely contact the circumference of the formwork 12d for the caisson 12c. Then, concrete is placed into the formwork 12d to form the caisson 12c (FIG. 8F). Then, the bottom surface of a formwork for the base slab portion 12a is fixed to the upper end of the caisson 12c by anchor bolts, and concrete is placed into the formwork for the base slab portion 12a to form the base slab portion 12a (FIG. 8G). Then, the tower 11 is fixed to the base slab portion 12a (FIG. 8H).

According to the above method, the seabed 200 is first excavated so that the caisson 12c can be supported therein. Then, the plurality of FUs 50 are installed flat on the bottom surface of the drilled hole 13. The formwork 12d for the caisson 12c is installed, and the plurality of FUs 50 are installed between the seabed 200 and the formwork 12d for the caisson 12c. Concrete is then placed into the formwork 12d to form the caisson 12c, and the base slab portion 12a is provided on the upper end of the caisson 12c. Since influence of the tidal current is decreased near the foundation on the seabed 200, scouring can be suppressed for a long time and the seabed 200 near the caisson 12c can be protected. As a result, the bearing force and the durability of the foundation can be improved. Further, since installed FUs serve as a part of the foundation, the foundation can be compact. In addition, since the net yarn of the FUs is made of synthetic fiber and FUs are porous, endocrine disrupter and heavy metal will not solve out and it is possible to provide biotope for seaweeds and fish.

Figure 8J:
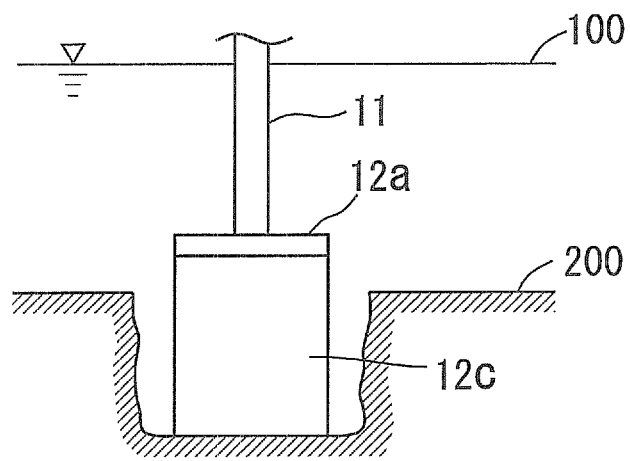
FIGS. 8J and 8K are diagrams showing an example in which FUs are installed for an existing foundation.
Figure 8K:
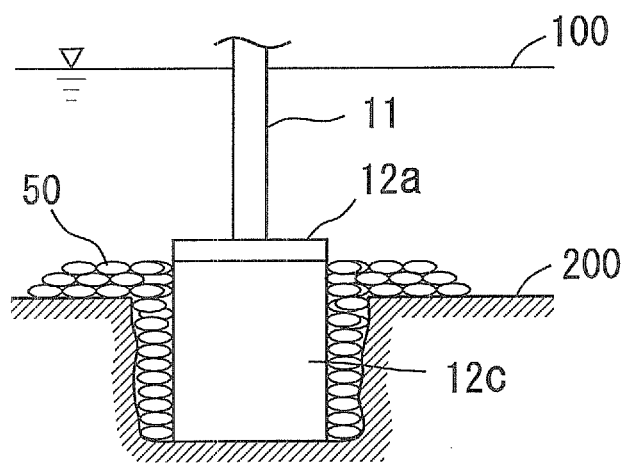

Next, an alternate embodiment is described. In this embodiment the FUs are installed in a foundation using the caisson of an existing wind power generation system. FIGS. 8J and 8K are diagrams showing this embodiment. FIG. 8J shows an existing wind power generation system to which this embodiment is applied. As shown in FIG. 8J, space is formed between the foundation 12a, 12c and the surrounding seabed 200. FIG. 8K shows a state where a plurality of FUs 50 are installed between the caisson 12c, serving as the base of the foundation and the seabed 200. Since the other portion of constructing the foundation is the same as above described embodiment, the explanation thereof will not be reiterated. In this embodiment, the FUs are installed around the deformed concave portion of the seabed which might be formed by scouring, for example. The present invention may be applied to the seabed which is not deformed.

In this alternate embodiment, the same meritorious effect is brought about as described above.

Note that the above embodiment is described with respect to an example in which the caisson 12c is formed by placing concrete, and then, the formwork for forming the base slab portion is installed thereon. However, the present invention may use a formwork capable of forming both the caisson and the base slab portion by placing concrete therein.

Note that the above embodiment is described with respect to an example in which the caisson 12c is formed by installing the formwork 12d onto the FUs installed on the bottom surface of the drilled hole 13, and placing concrete into the installed formwork 12d. However, the caisson 12c, which has been fabricated in advance, may be installed onto the FUs 50 installed on the bottom surface of the drilled hole 13.

Note that the above embodiment is described with respect to an example in which one type of FUs are installed. However, the present invention is not limited to this, and two kinds of FUs, one is a large FU and the other is a small FU, may be used. For example, in the case where it is necessary to follow unevenness of the seabed, small FUs are preferably used. On the other hand, when it is necessary to prevent reduce speed of the tidal current, large FUs are used. In addition, a plurality of FUs including different kinds of block objects depending on the conditions required. Thus, the similar effect is brought about as described in the first embodiment.

(3) Third Embodiment

Figure 9A:
FIGS. 9A, 9B, and 9C are diagrams sequentially illustrating a method for protecting a submarine cable for a wind power generation system.
Figure 9B:
Figure 9C:
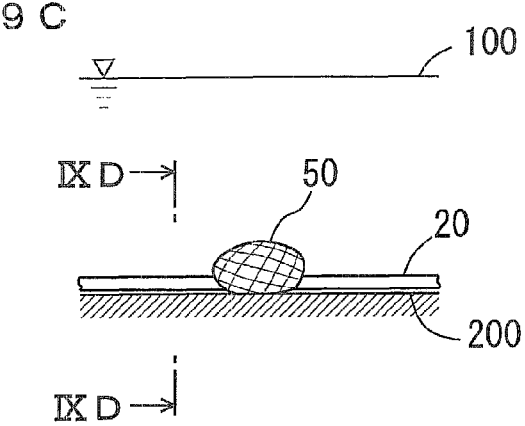
Figure 9D:
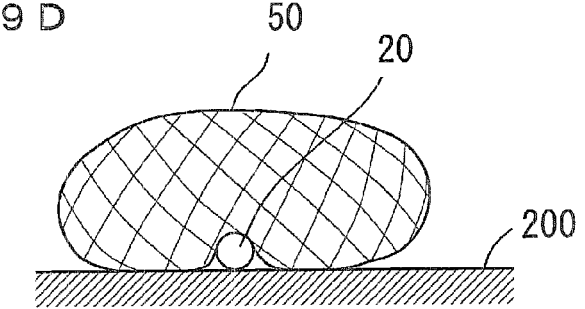
FIG. 9D is a diagram viewed from IX D-IX D in FIG. 9C.
Figure 10:
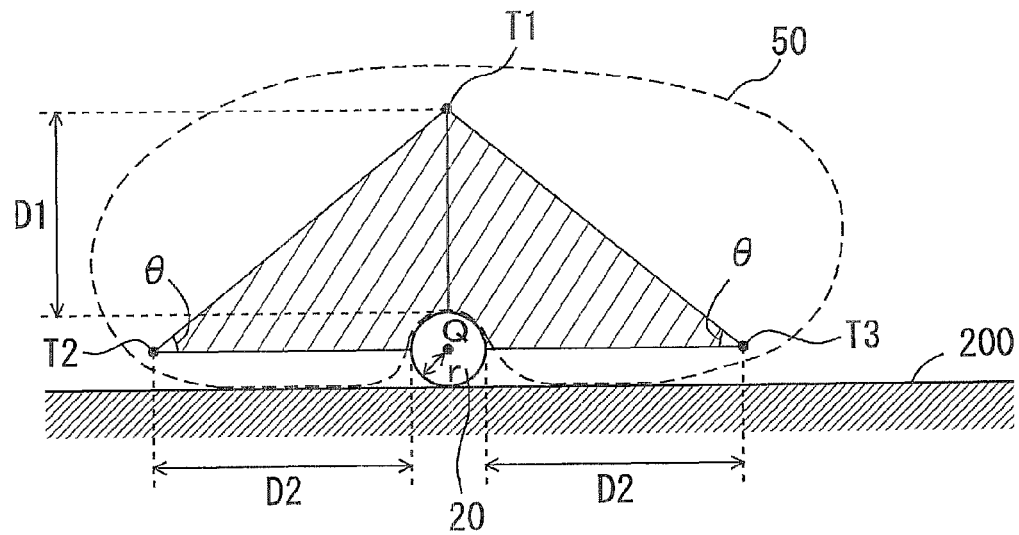
FIG. 10 is a view showing how a FU covers a cable.

The third embodiment will be described below with respect to an installation method of the FUs. A method for protecting a submarine cable for a wind power generation system will be described in the present embodiment. FIGS. 9A through 9C are diagrams sequentially illustrating the method for protecting a submarine cable for a wind power generation system, FIG. 9D is a diagram viewed from line IXD-IXD in FIG. 9C and FIG. 10 is a diagram showing conditions when a FU is installed. Note that FUs 50 used in the present embodiment are similar to those of the above embodiment.

First, at a location where the submarine cable 20 is to be installed, the condition of the seabed 200 and the condition of the tidal currents near the seabed 200 are investigated in advance to examine the size and the number of FUs 50 and the position where the FUs 50 are to be installed (FIG. 9A). Next, the submarine cable 20 is installed on the seabed 200 (FIG. 9B). Then, an FU 50 is installed so as to cover the submarine cable 20 installed on the seabed 200 (FIG. 9C).

At this time, with reference to FIG. 10, conditions required are explained. FIG. 10 is a diagram showing the cross section perpendicular to the direction which the submarines cable elongates. More specifically, assuming the center point of the cable section is Q and its radius is r(m), the point above the cable which is located at the distance D1 (m) from the top surface of the cable 20 is T1, the points which is located at the distance D2 (m) from the side surface of the cable 20 are T2 and T3, and equal two lower angles formed by a isosceles triangle made by points T1, T2 and T3 are θ. In addition, when block objects placed in the FUs are fallen from upper position to the ground, a conical shaped mountain is naturally formed by the block object. It is assumed that the angle is defined as φ formed by the inclined side of the mountain and the ground. It is preferable that the FU cover the hatched isosceles triangle shown in FIG. 10 in which D1≥0.5 m, D2≥1.0 m, and θ≤φ. At this time, normally φ is 45 degrees or less. It is preferable that θ is 30 degrees or less. In FIG. 10, the dotted line shows the cross section of the FU satisfying the above described conditions.

Since the submarine cable is fully covered by the FU stably, the submarine cable 20 is fixed so as not to move by the influence of the tidal currents around it (see FIG. 9D), and can be protected from, e.g., anchors of ships, rolling stones carried by the tidal currents, and the like.

According to the above method, the FUs 50 are installed so as to cover the submarine cable 20. Thus, the submarine cable 20 is fixed by the seabed 200 and the FUs 50, and can be prevented from moving by the influence of the tidal currents around it and the like. This can prevent generation of friction between the seabed 200 and the submarine cable 20, and can prevent scouring near the installed submarine cable 20 for a long time. As a result, the submarine cable 20 can be protected for a long time.

Note that the above embodiment is described with respect to an example in which a submarine cable is newly installed. However, the FU 50 may be installed so as to cover an existing submarine cable.

Note that the above embodiment is described with respect to an example in which one FU 50 is installed. However, it is more preferable to install a plurality of FUs 50. The use of the plurality of FUs 50 increases the weight for fixing the submarine cable 20, enabling the submarine cable 20 to be fixed firmly. In addition, as described in the first embodiment, the group effect is obtained and the cable can be fixed stably by installing a plurality of FUs.

Figure 11A:
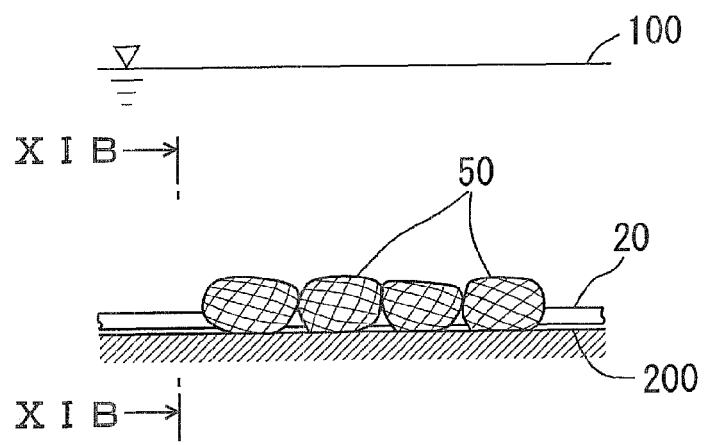
FIG. 11A is a diagram showing an example in which a submarine cable is protected by using a plurality of FUs.
Figure 11B:
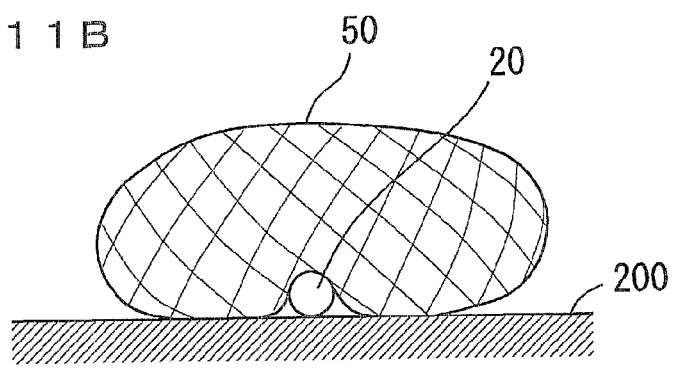
FIG. 11B is a diagram viewed from XI B-XI B in FIG. 11A.
Figure 12A:
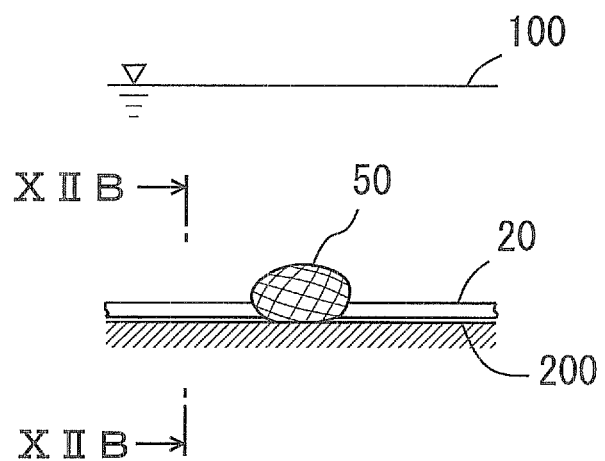
FIG. 12A is a diagram showing an example in which a submarine cable is protected by using two FUs.
Figure 12B:
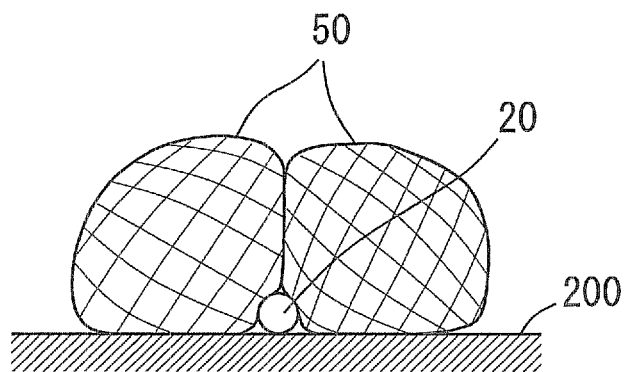
FIG. 12B is a diagram viewed from position XII B-XII B in FIG. 12A.
Figure 13A:
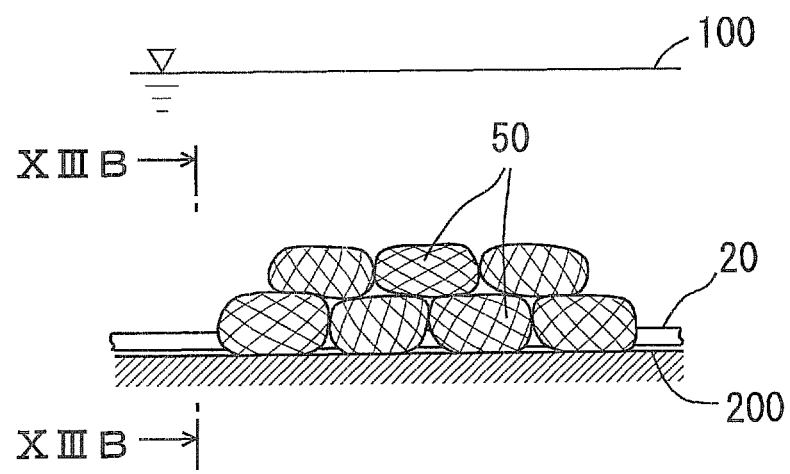
FIG. 13A is a diagram showing an example in which a submarine cable is protected by using a plurality of FUs.
Figure 13B:
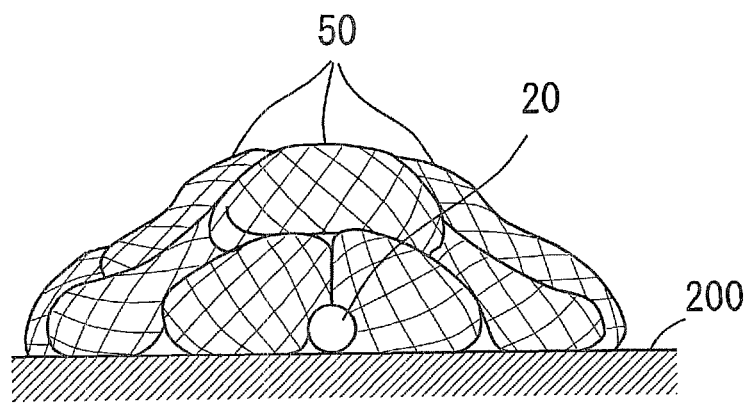
FIG. 13B is a diagram viewed from XIII B-XIII B in FIG. 13A.

Next, some of examples in which the submarine cable 20 is fixed by a plurality of FUs 50 will be described below. FIG. 11A shows an example in which a plurality of FUs 50 are continuously arranged in line in the direction in which the submarine cable 20 extends (hereinafter referred to as the "extending direction of the submarine cable 20"), and FIG. 11B is a diagram viewed from XI B-XI B in FIG. 11A. FIG. 11A shows only a part of installed FUs. FIG. 12A shows an example in which two FUs 50 are arranged side by side with the submarine cable 20 interposed therebetween, and FIG. 12B is a diagram viewed from position XII B-XII B in FIG. 12A. Note that, in this case as well, a plurality of FUs 50 may be continuously arranged in two lines along the extending direction of the submarine cable 20. FIG. 13A shows an example in which the submarine cable 20 is fixed by using a multiplicity of FUs 50, and FIG. 13B is a diagram viewed from position XIII B-XIII B in FIG. 13A. In any case, the FUs 50 are installed so as to cover the submarine cable 20, whereby the submarine cable 20 is fixed by the seabed 200 and the FUs 50, and can be prevented from moving by the influence of the tidal currents around it. This can prevent generation of friction between the seabed 200 and the submarine cable 20, and can also prevent scouring near the installed submarine cable 20 for a long time. As a result, the submarine cable 20 can be protected for a long time. In the above embodiment, a plurality of FUs are continuously arranged. It is possible to install continually a plurality FUs in an extending direction of the submarine cable 20. For example, by installing continually a plurality FUs at the position where the cable 20 is likely to be moved by the tidal current, it is possible to minimize quantity of work and amount of FUs to be used.

Note that, in the above embodiment, even if scouring occurs around the FUs 50 provided to protect the submarine cable 20, the FUs 50 follow the deformed seabed 200, and thus, repairs can be made by, e.g., merely providing the FUs 50 over the recessed portion of the seabed 200 by the amount corresponding to the amount of the recess. Thus, repairs can be easily made at low cost.

Note that it is preferable that the method for protecting a submarine cable for a wind power generation system according to the above embodiment be applied to the case where the water depth to the seabed 200 is about 3 m or more.

Note that the above embodiment is described with respect to an example in which a submarine cable is protected by covering the cable with FUs. At this point, the submarine cable includes ones of telephone lines, the optical fibers and so on. This method can be applied to the cases where the submarine long objects such as long tubes and pipelines for the gas, the oil and so on.

(4) Fourth Embodiment

Next, the fourth embodiment will be described below with respect to the installation method of the FUs. In the fourth embodiment, a method for planarizing an uneven surface of the seabed will be described in this embodiment. Basically, one sized FUs are used to planarize uneven surfaces. In the following an embodiment is described wherein two kinds of FUs whose sizes are different.

Figure 14A:
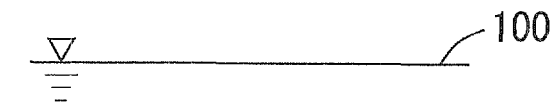
FIGS. 14A, 14B, and 14C are diagrams sequentially illustrating a method for planarizing an uneven surface of the seabed.
Figure 14B:
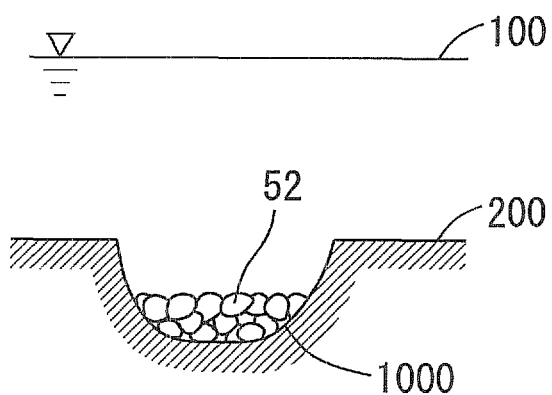
Figure 14C:
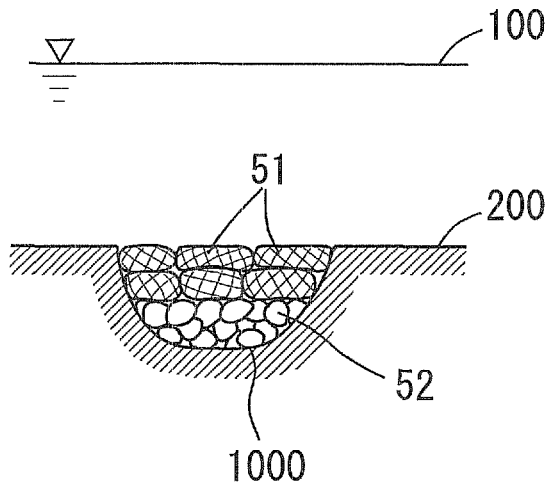

FIGS. 14A through 14C are diagrams sequentially illustrating the method for planarizing an uneven surface of the seabed. The large FUs and the small FUs described in the first embodiment are used. It is herein assumed that it has been determined based on the investigation that these FUs are suitable for planarization in this embodiment. The block objects placed in the large and small FUs are those having diameter of 50-300 m and specific weight of 2.65. As to other points, there is no difference between the large and small FUs.

First, the condition of an uneven surface 1000 of the seabed 200 is investigated in advance to examine the respective numbers of large FUs 51 and small FUs 52 to be used, and the position where the large FUs 51 and the small FUs 52 are to be installed (FIG. 14A). Then, based on the investigation result, the small FUs 52 are installed on the bottom of the recess of the uneven surface 1000 (FIG. 14B). At this time, it is preferable to install the small FUs 52 so that the upper surface formed by the small FUs 52 becomes as flat as possible. Then, the large FUs 51 are installed on the upper surface formed by the small FUs 52, and are leveled so that the upper surface formed by the small FUs 52 becomes flush with the seabed 200 (FIG. 14C). Based on the description of the above embodiments, using a plurality of different types of FUs, such as the large FUs 51 and the small FUs 52, improves engagement between the plurality of different types of FUs, and the plurality of different types of FUs closely contact each other. Thus, the different types of FUs are integrated firmly, increasing the stability of the large FUs 51 and the small FUs 52 installed in the recess of the uneven surface 1000. Thus, the influence of the tidal currents can be reduced. Moreover, the large FUs 51 are installed so that the upper surface formed by the large FUs 51 becomes as flush with the seabed 200 around the recess of the uneven surface 1000 as possible.

It is preferable to install the FUs in ascending order of weight. In this case, the large FUs 51 are installed on the upper surface formed by the small FUs 52. Thus, the small FUs follow the bottom of the uneven surface 1000 and it is possible to make the upper surface of the small FUs flat. In addition, by the large FUs installed on the flat small FUs, the whole FUs can be stable.

In this embodiment, since the small FUs are installed on the bottom surface of the uneven surface 1000, the large FUs are installed on the small FUs and the top surface of the installed large FUs are leveled so that the upper surface formed by the small FUs 52 becomes flush with the seabed 200. Thus, the large FUs 51 and the small FUs 52 engage with each other, whereby a highly integrated, substantially flat seabed 200 having no gap between the FUs can be formed. As a result, the uneven surface can be turned into a substantially flat, firm seabed.

Figure 15:
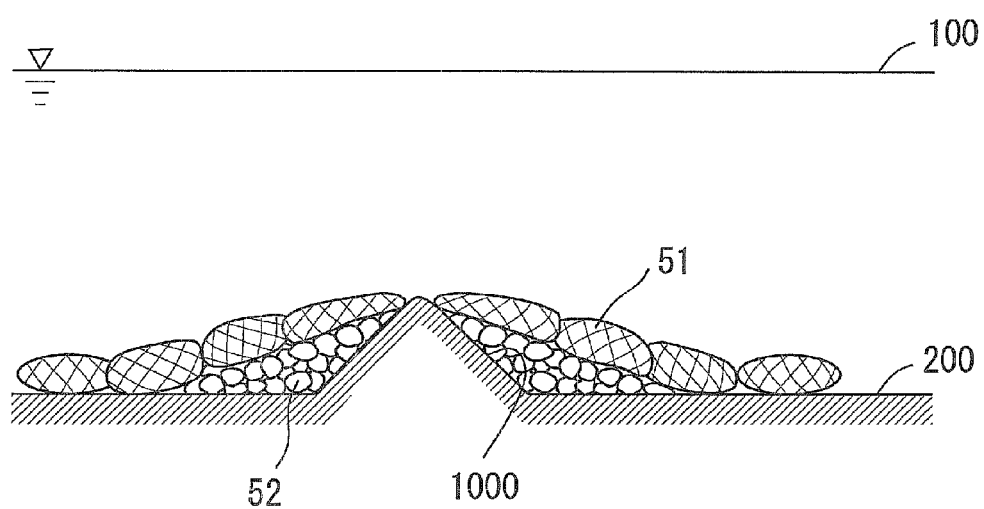
FIG. 15 is a schematic diagram showing an example of planarization of a convex uneven surface.
Figure 16A:
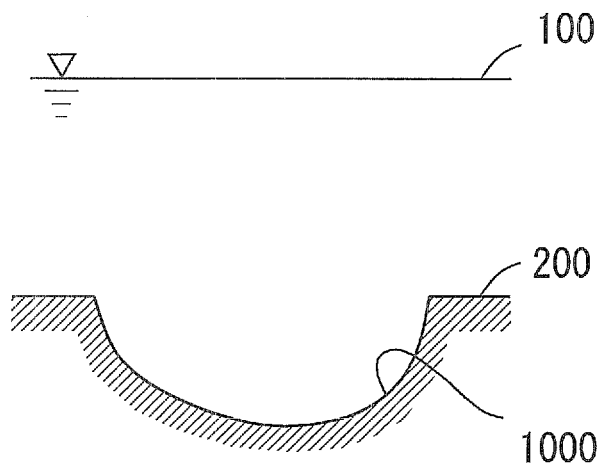
FIG. 16A is a cross-sectional view showing an uneven surface.
Figure 16B:
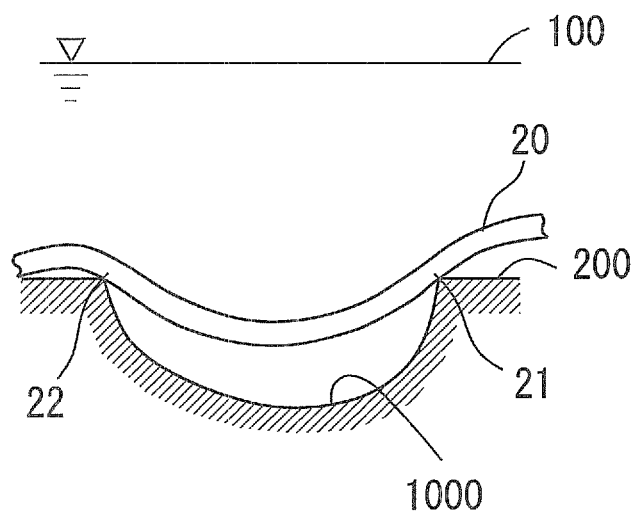
FIG. 16B is a cross-sectional view showing an example in which a submarine cable is installed on the uneven surface.

Note that the above embodiment is described with respect to an example in which the concave uneven surface is leveled. However, the present invention is not limited to this, and this method can be applied to an example in which the convex uneven surface is leveled. FIG. 15 is a diagram showing this example. With reference to FIG. 15, in this method, at first, the small FUs 52 are installed around the convex uneven surface similar to the above embodiment. Then a large FUs 51 are installed on the small FUs 52. After the large FUs are installed, the top surface of the installed large FUs are leveled so that the upper surface formed by the small FUs 52 becomes flush with the seabed 200. As a result, it is possible to planarize the convex uneven surface against the seabed.

Note that the above embodiment is described with respect to an example in which two types of FUs, which are the large FUs 51 and the small FUs 52. However, the present invention is not limited to this, and only one type of FUs may be used. That is, the uneven surface 1000 may be planarized by leveling one type of FUs so that the upper surface formed by the FUs becomes flush with the seabed 200. A plurality of types of FUs, containing different types of block objects from each other, may be used to planarize the uneven surface 1000. For example, FUs containing block objects having 100 mm diameter and FUs containing block objects having 200 mm diameter are used. In this case, FUs containing block objects having small diameter prevents earth and sand from being sucked out from the seabed surface and follow the unevenness of the seabed. Further, two kinds of FUs having different sized block objects, engage with each other, and can be integrated with no gap therebetween. It is preferable to install the FUs in ascending order of the grain size of the block objects. In this case, since the FUs with small grain size follow the shape of uneven surfaces 1000 and it is possible to form a flat surface on the upper surface of the small FUs and the whole FUs are stably installed since the large FUs are installed on the flat surface of the small FUs.

The method for planarizing the uneven surface of the seabed according to the above embodiment may be applied together with, e.g., a barge vessel for dumping crushed stones. In this case, the uneven surface 1000 of the seabed 200 may be planarized as follow. First, crushed stones are dumped from the barge vessel to the bottom of the recess of the uneven surface. After a desired amount of crushed stones is dumped, the large FUs 51 and the small FUs 51, for example, are installed as described in the above embodiment by using the method for planarizing the uneven surface of the seabed. This enables the uneven surface to be efficiently planarized at low cost.

Note that the above embodiment is described with respect to an example in which the uneven surface 1000 is planarized. After the uneven surface is planarized, a submarine cable for a wind power generation system may be installed so as to extend on the planarized uneven surface, or an underwater structure may be installed on the planarized uneven surface. As described in the above embodiment, the submarine cable may be fixed and protected by using the FUs.

Note that, in the above described first to fourth embodiments, the position where the FUs 50 are to be installed may be located by a global positioning system (GPS). For example, a work ship for installing the FUs 50 on the seabed 200, and a tow body for submerging to investigate the condition under the sea according to signals received from the work ship are applied to the above embodiment. The tow body includes: a bathymetric sonar for radiating sound waves in a fan-shaped radiation pattern to the seabed, and receiving reflected waves from the seabed to measure the depth to the seabed; an oscillation sensor for measuring and correcting the tilt of the bathymetric sonar associated with oscillation of the tow body; a water pressure sensor for measuring an accurate water pressure to keep track of a change in water depth of the tow body; and a transponder for calculating the distance to the work ship and the azimuth of the tow body. The work ship includes: an operation apparatus for operating the tow body; a GPS positioning apparatus for keeping track of the position of the work ship; and a GPS azimuth sensor for keeping track of the azimuth of the work ship; an undersea positioning system for receiving sound waves from the transponder of the tow body, and measuring the position of the tow body; dedicated software for analyzing data obtained from the tow body, based on the respective positions of the tow body and the work ship; and a tow winch connected to the tow body and the cable, for controlling movement of the tow body. First, the operation apparatus in the work ship is operated to submerge the tow body under the sea. The submerged tow body obtains data regarding the condition of the seabed by using the bathymetric sonar, while transmitting its own position and condition to the work ship by the oscillation sensor, the water pressure sensor, and the transponder. The obtained data regarding the seabed is transmitted to the work ship to keep track of the condition of the seabed by the dedicated software of the work ship. The position where the FUs are to be installed is located by the obtained data from the tow body, the GPS positioning apparatus, and the GPS azimuth sensor. This enables the FUs are to be accurately installed at a desired position. For example, the position where the FUs are to be installed may be located and recorded by the GPS positioning apparatus in the investigation that is conducted in advance, and the FUs may be installed based on the recorded data.

Note that, in the above described first to fourth embodiments, the FUs 50 may be installed by suspending each FU 50 by a crane or the like. In this case, the FUs 50 may be installed by automatically releasing the connection portion 504 of each FU 50 from the crane when the FU 50 is moved to a predetermined installation position. This reduces, e.g., labor and danger of divers who give instructions and assist in working on the seabed, in the operation of releasing each FU 50 from the crane.

Note that, in the above described first to fourth embodiments, the plurality of installed FUs may be connected by connection members such as a rope, a chain, or the like. This enables the stability between the plurality of FUs 50 to be maintained for a long time, whereby the bearing force and durability of the foundation can further be improved.

Note that, in the above described first to fourth embodiments, the FUs 50 may be installed one by one, or more than one FUs 50 may be installed simultaneously.

Although the embodiments of the present invention have been described with reference to the drawings, the present invention is not limited to the illustrated embodiments. Various modifications and variations can be made to the illustrated embodiments within a scope that is the same as, or equivalent to, the present invention.

What is claimed is:

1. A method for planarizing unevenness which is an uneven surface of a seabed when installing submarine cables, tubes or pipelines, comprising the steps of:

installing a plurality of bag-shaped filter units, each containing predetermined block objects, on said unevenness, an entirety of the installed plurality of bag-shaped filter units forming an uppermost surface adjacent the uneven surface of the seabed;

leveling the installed said plurality of bag-shaped filter units so that the uppermost surface formed by the installed said plurality of bag-shaped filter units becomes flush with said seabed adjacent to the uneven surface, and installing submarine cables, tubes or pipelines on said flush seabed.

2. The method according to claim 1, wherein
said step of installing said plurality of bag-shaped filter units includes a step of locating a position where said plurality of bag-shaped filter units are to be installed, by using a global positioning system (GPS).

3. The method according to claim 1, wherein
said plurality of bag-shaped filter units include a first bag-shaped filter unit having a first size and a second bag-shaped filter unit having a second size larger than said first size, and;
said step of installing said plurality of bag-shaped filter units includes a step of placing said second bag-shaped filter unit on said first bag-shaped filter unit.

4. The method according to claim 1, wherein
said plurality of bag-shaped filter units have a predetermined size and;
said step of installing said plurality of bag-shaped filter units includes a step of placing crushed stones on said unevenness before placing said plurality of bag-shaped filter units with the predetermined size.

5. The method according to claim 1, wherein
said plurality of bag-shammed filter units have a predetermined outer size and include a first bag-shaped filter unit having first block objects with a first size and a second bag-shaped filter unit having second block objects with a second size larger than said first size and;

said step of installing said plurality of bag-shaped filter units includes the step of placing said second bag-shaped filter unit on said first bag-shaped filter unit.

6. The method according to claim 1, wherein said step of installing said plurality of bag-shaped filter units includes the step of placing crushed stones at a bottom of said unevenness before placing said plurality of bag-shaped filter units.

7. The method according to claim 1, wherein a volume of said plurality of bag-shaped filter units is equal or smaller than a volume of said unevenness.

8. The method according to claim 1, wherein each bag-shaped filter unit includes a bag body and the predetermined block objects, and;

when said each bag-shaped filter unit is hung up, assuming that a height of said bag body from a closed portion to a bottom is $H1$ and a height of a space without said predetermined block objects is $H2$, an amount of the predetermined block objects obtained by $(H2/H1) \times 100$ is 25-80%.

9. The method according to claim 8, wherein the bag body comprises a knitted fabric, and a porosity of the knitted fabric of said bag body is 45% to 90%.

\* \* \* \* \*